(12) United States Patent
McDowall et al.

(10) Patent No.: US 7,061,154 B2
(45) Date of Patent: Jun. 13, 2006

(54) LIGHTWEIGHT WEDGE DESIGN FOR HIGH SPEED GENERATORS

(75) Inventors: Gregor McDowall, Phoenix, AZ (US); Norman O. Harris, Jr., Oro Valley, AZ (US); Bruce A. Nelson, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/807,724

(22) Filed: Mar. 24, 2004

(65) Prior Publication Data
US 2005/0212373 A1 Sep. 29, 2005

(51) Int. Cl.
*H02K 15/12* (2006.01)

(52) U.S. Cl. ........................................ 310/214; 310/45

(58) Field of Classification Search ................ 310/216, 310/214, 45; 242/433, 433.4, 448
See application file for complete search history.

(56) References Cited

U.S. PATENT DOCUMENTS

| | | | |
|---|---|---|---|
| 941,180 A | 11/1909 | Young | |
| 941,182 A | 11/1909 | Young | |
| 2,400,576 A * | 5/1946 | Sigmund et al. | 204/475 |
| 2,569,278 A | 9/1951 | Barth | |
| 3,008,786 A * | 11/1961 | Costello | 310/214 |
| 3,440,462 A | 4/1969 | Willyoung | |
| 3,660,702 A | 5/1972 | Kishino | |
| 3,781,581 A | 12/1973 | Lehuen et al. | |
| 4,152,610 A | 5/1979 | Wallenstein | |
| 4,363,982 A | 12/1982 | Kaminski | |
| 4,365,177 A | 12/1982 | Madsen | |
| 4,409,502 A | 10/1983 | McCabria | |
| 4,876,469 A | 10/1989 | Khutoretsky et al. | |
| 4,908,537 A | 3/1990 | Sismour, Jr. | |
| 5,122,698 A | 6/1992 | Walker et al. | |
| 5,140,204 A | 8/1992 | Cashmore et al. | |
| 5,421,077 A | 6/1995 | Zayechek et al. | |
| 6,054,790 A * | 4/2000 | Kjeer et al. | 310/214 |
| 6,113,024 A * | 9/2000 | Pittard et al. | 242/433 |
| 6,218,759 B1 | 4/2001 | Blakelock et al. | |
| 6,316,852 B1 | 11/2001 | Semba et al. | |
| 6,459,180 B1 | 10/2002 | Mori et al. | |
| 6,509,667 B1 | 1/2003 | El-Antably et al. | |
| 6,570,291 B1 | 5/2003 | Spaggiari | |
| 6,621,187 B1 | 9/2003 | Mori et al. | |
| 6,979,929 B1 * | 12/2005 | Tornquist et al. | 310/214 |
| 2003/0048015 A1 | 3/2003 | Tomquist et al. | |

FOREIGN PATENT DOCUMENTS

| | | |
|---|---|---|
| DE | 12 05 182 | 11/1955 |
| FR | 2 842 688 A | 1/2004 |
| JP | 55 083530 A | 5/1980 |
| WO | PCT/US2005/009552 | 6/2005 |

* cited by examiner

*Primary Examiner*—Tran Nguyen
(74) *Attorney, Agent, or Firm*—Ingrassia Fisher & Lorenz

(57) ABSTRACT

A wedge-shaped member to restrain coil windings of a generator rotor from moving under centrifugal force. The wedge-shaped, substantially hollow member including a first plate, a second plate positioned opposite the first plate and positioned at an angle relative to the first plate, and one or more reinforcing members coupled between the first plate and the second plate. The wedge-shaped member is configured to fit between the core poles of a generator. A plurality of holes in the first and/or second plates permit a bonding material to adhere to adjacent coil windings and spread through the holes.

15 Claims, 3 Drawing Sheets

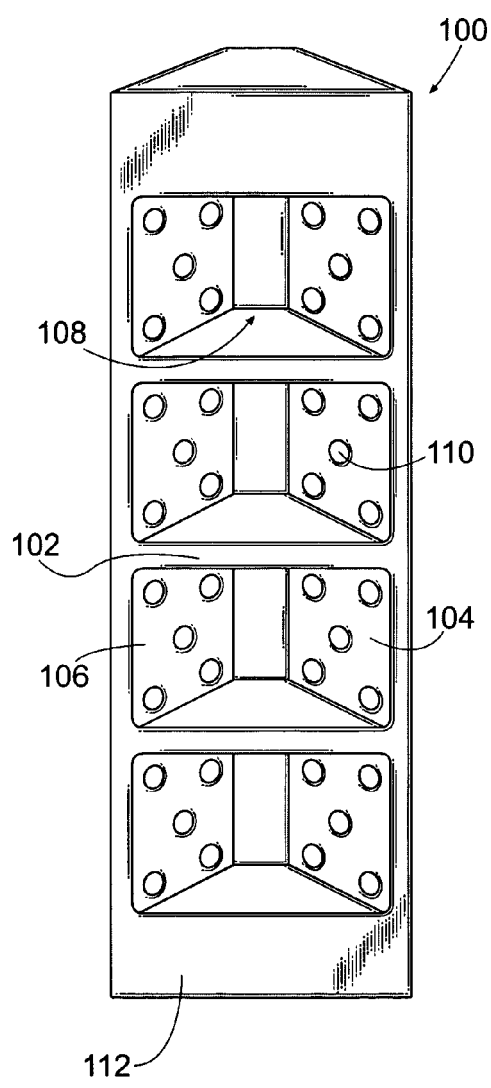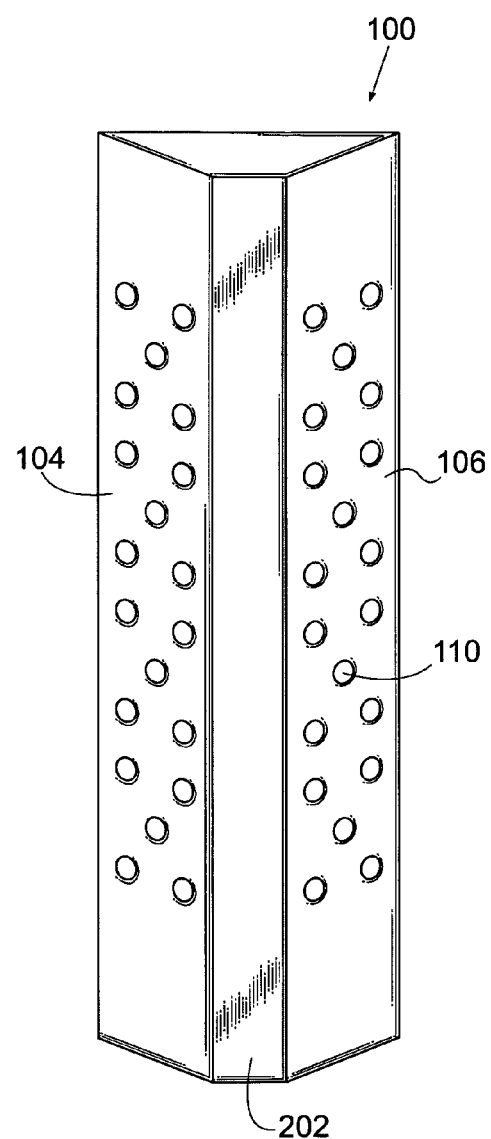
Fig. 1
Fig. 2

LIGHTWEIGHT WEDGE DESIGN FOR HIGH SPEED GENERATORS

FIELD OF THE INVENTION

Various embodiments of the invention pertain to electric generators and motors. More particularly, one embodiment of the invention pertains to a wedge design for high speed electric generators.

DESCRIPTION OF RELATED ART

Wound-type induction machines have long been used as electric generators and motors. In a typical generator design, a direct current (DC) wound rotor includes a magnetic core with multiple poles, each wrapped with a coil. Such rotor spins at high revolutions per minute (RPM) and subjects its components to high centrifugal loads. To prevent the coils from being spun off the core, wedges are employed in the inter-polar area. At high RPM (>12,000 RPM) the stress in the pole tips of the rotor core may be high enough to prevent them from being used to support the wedge. The loads that are experienced by the wedge in these conditions are those imposed by the coil and also those resulting from the centrifugal load due to the bulk mass and also the center of mass of the wedge itself relative to the axis of rotation of the rotor. These two design factors are controlled by the shape of the design and the density of the material. In a conventional wedge design these conditions result in a conflicting design where the wedge gains weight in order to have enough strength to resist the forces it is subjected to. This additional weight then increases the forces resulting in a vicious circle with thicker webs being used to provide stiffness merely to provide the stiffness to support the wedge itself.

BRIEF DESCRIPTION OF THE DRAWINGS

FIG. 1 illustrates a generator wedge according to one embodiment of the invention.

FIG. 2 illustrates a rear view of the generator wedge of FIG. 1 according to one embodiment of the invention.

SUMMARY OF THE INVENTION

Figure 3:
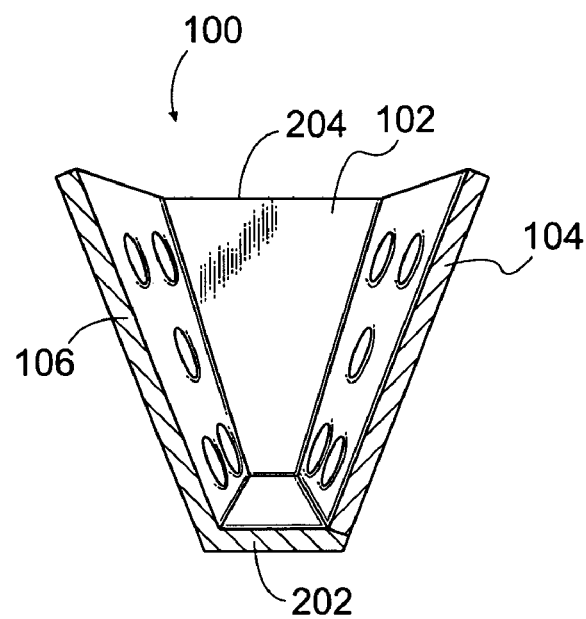
FIG. 3 illustrates a cross-sectional view of the generator wedge of FIG. 1 according to one embodiment of the invention.

One embodiment of the invention provides a wedge-shaped member to restrain coil windings of a generator rotor from moving under centrifugal force. The wedge-shaped member includes a first plate, a second plate opposite the first plate but at an angle to the first plate, and one or more reinforcing members coupled between the first plate and the second plate and substantially perpendicular to the first plate and second plate. The wedge-shaped member is configured to fit between the core poles of a generator.

One embodiment of the invention may be implemented in a generator having a substantially cylindrical rotor frame, a plurality of core poles coupled around the rotor frame, the plurality of core poles extending radially from the rotor and having core pole tips that are wider than the core poles. A coil is wound around a first core pole and a wedge-shaped member positioned between the first core pole and a second core pole to support the coil on the first core pole as the rotor frame is rotated. The wedge-shaped member includes a first plate having a plurality of through-holes, the first plate abutting the first core pole, a second plate abutting the second core pole. A third plate has a first longitudinal edge coupled along a first longitudinal edge of the first plate and a second longitudinal edge of the third plate coupled to a first longitudinal edge of the second plate. One or more reinforcing cross members are coupled between a second longitudinal edge of the first plate and a second longitudinal edge of the second plate to the third plate. The coil wound around the first core pole is restrained by a bonding material impregnated between the coil and the one or more passages through the first plate.

According to one embodiment of the invention, the wedge-shaped member has a substantially trapezoidal cross-sectional area. The third plate may have a curvature that conforms to the cylindrical rotor frame.

In one embodiment of the invention, the second longitudinal edge of the first plate is retained by the core pole tip of the first core pole and the second longitudinal edge of the second plate is retained by the core pole tip of the second core pole.

DETAILED DESCRIPTION

Devices and apparatus that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

In the following description, certain terminology is used to describe certain features of one or more embodiments of the invention. The term "windings" includes wound-type coils and similar devices. The term "generator" includes motors, electrical generators, induction machines, etc.

One embodiment of the invention provides a wedge to fit between poles to prevent coils from being spun off the core.

FIG. 1 illustrates a generator wedge according to one embodiment of the invention. The wedge 100 has a trapezoidal shape to fit between the rotor coils of a generator. The wedge 100 is substantially hollow or includes a plurality of cavities 108 to keep the center of mass of the generator as close to the axis of rotation as possible. Such hollow wedge configuration avoids increasing the loads on the wedge 100 in a high speed generator. By having a hollow body or a plurality of cavities 108, the wedge's center of mass is moved closer to the generator's axis of rotation thereby reducing the centrifugal load generated by the weight of the wedge 100 itself. As a result, the shape of the wedge 100 may be optimized for strength and weight.

A plurality of webs or support cross members 102 provide support to the coils of a generator at multiple points along the span of the core. In between the webs or cross members 102, thin side walls 104 and 106 are used to hold the webs 102 in position between the generator coils.

The number of webs 102 and/or spacing between the webs 102 may be dictated by the coil loads that the wedge 100 is expected to resist. This configuration eliminates most of the weight found in existing wedge designs.

According to one embodiment of the invention, a pattern of holes 110 are defined by the side walls 104 and 106. These holes 110 further reduce weight and also help resist movement of the wedge 100 by keying an impregnation material between the wedge 100 and the coil insulation. The impregnation material binds to the coils as well as flows through the holes 110 to create a strong bond between the coils and side walls 104 and 106. Moreover, a radius member 112 at each end of the wedge 100 may serve to couple the wedge 100 to a generator rotor.

Additionally, the substantially hollow wedge 100 may also improve cooling of the rotor coils due to the shorter heat conduction path and greater wetted area for the cooling medium to impinge upon. That is, in contrast to a conventional solid wedge, the wedge 100 having a hollow area or a plurality of cavities 108 reduces the amount of material through which heat from the coils must travel before it is dissipated. Also, the additional surface area formed by the surfaces inside the cavities 108 increases the area through which heat from the rotor coils may be dissipated.

FIG. 2 illustrates a rear view of the generator wedge of FIG. 1 according to one embodiment of the invention. The short side 202 of the trapezoid-shaped wedge 100 is typically inserted in between rotor coils so that it is the closest to the generator's axis of rotation. As illustrated in FIG. 2, the holes 110 extend from one side of the side walls 104 and 106 to the other side.

FIG. 3 illustrates a cross-sectional view of the generator wedge of FIG. 1 according to one embodiment of the invention. The angle between the side walls 104 and 106 and short side 202 of the wedge 100 may vary depending on the physical dimensions of the rotor coils for the generator in which the wedge 100 is to be used. The web or support cross members 102 may extend from the short side 202 to the long side 204 of the wedge 100. In other implementations, the web 102 may partially extent between the short side 202 to the long side 204 of the wedge 100. In other embodiments of the invention, the web 102 may also include a one or more openings or holes for further ventilation or to reduce the overall weight of wedge 100.

Figure 4:
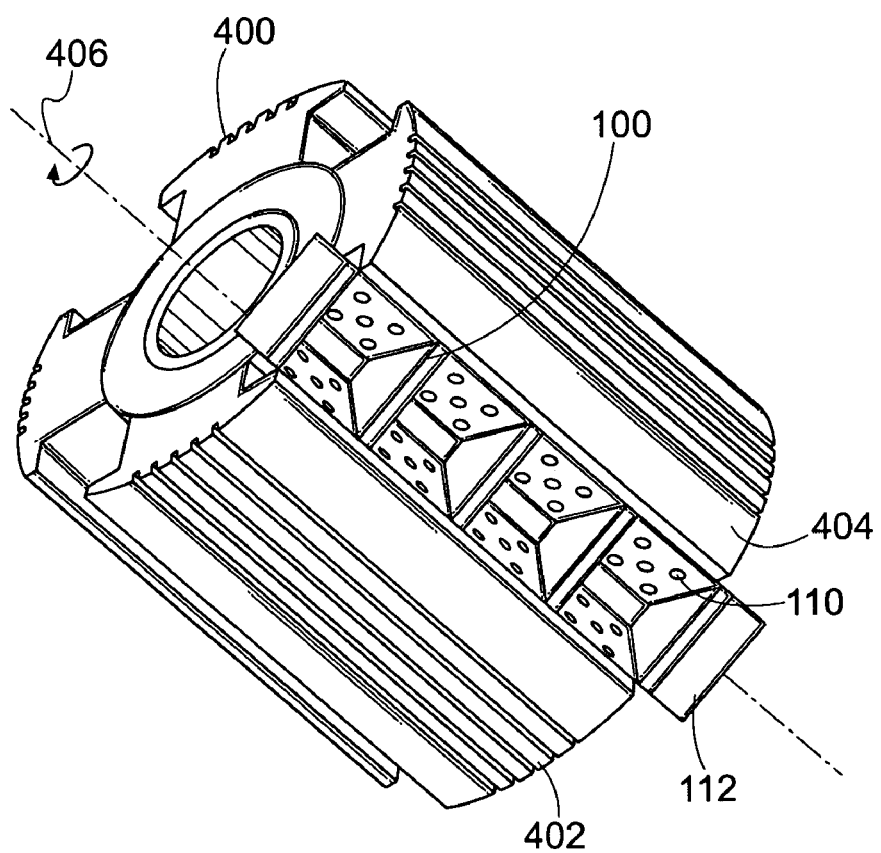
FIGS. 4, 5, and 6 illustrate how a generator wedge may be positioned within a generator according to one embodiment of the invention.
Figure 5:
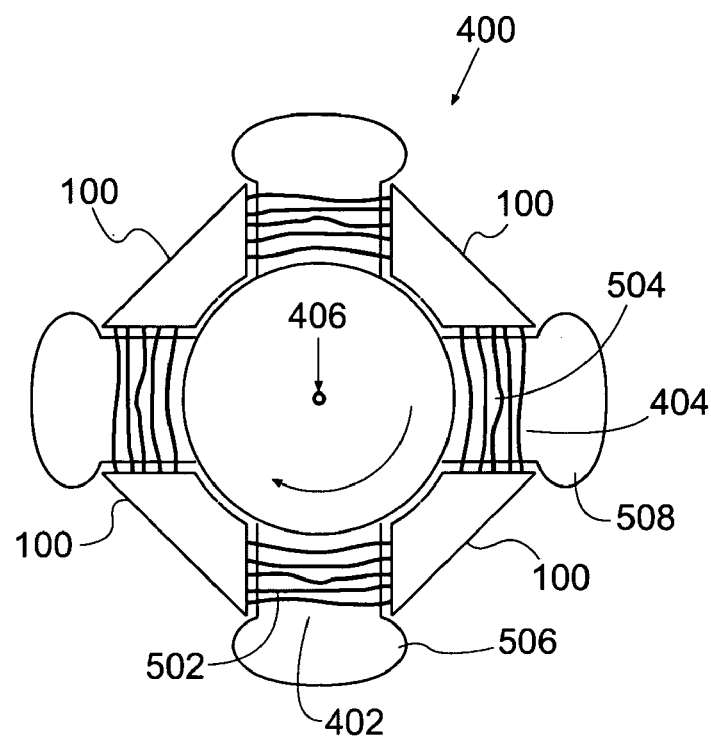
Figure 6:
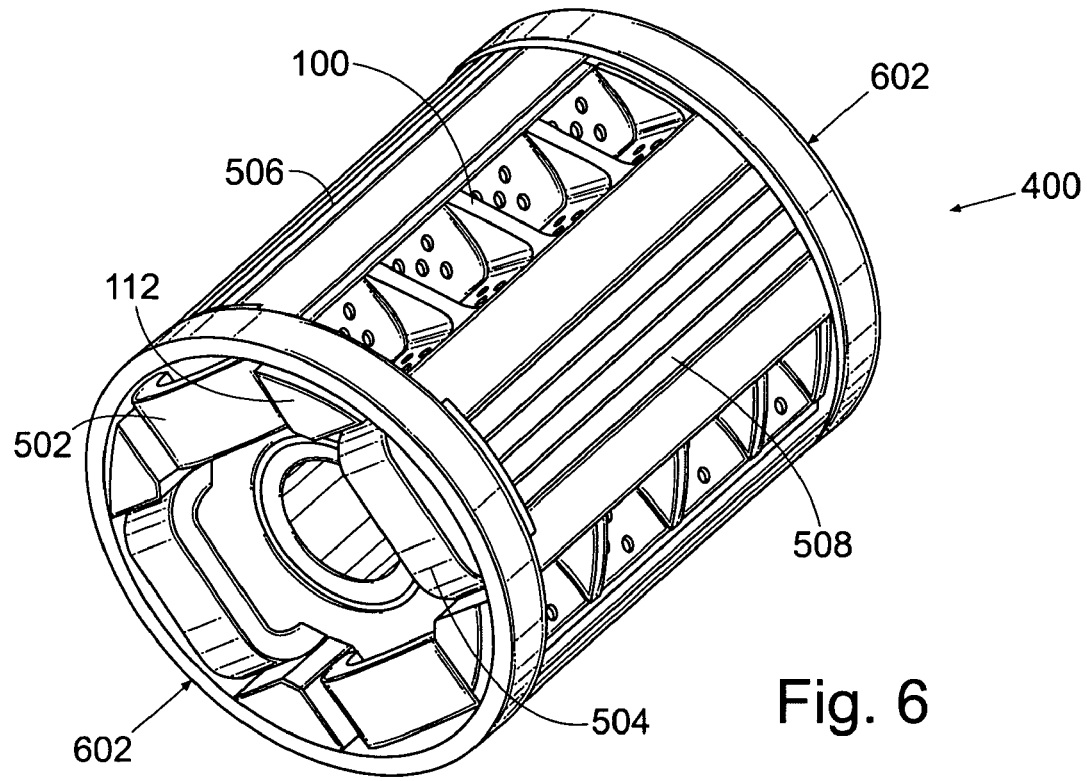

FIGS. 4, 5, and 6 illustrate how a generator wedge 100 may be positioned within a generator 400 according to one embodiment of the invention. The wedge 100 is placed between to rotor core poles 402 and 404 as shown. Coils 502 and 504 are wound around the first and second cores poles 402 and 404 respectively. The generator 400 rotates about an axis 406. Typically, a wedge 100 is placed between every core pole to provide support to the coils wound thereon.

In one implementation of the invention, the generator 400 includes core poles 402 and 404 having pole tips 506 and 508 that may serve to provide support to the wedge 100 when the generator 400 rotates about its axis 406. The wedge 100 may be designed so that it fits snugly between the core poles 402 and 404 and the core poles tips 506 and 508, which retain the wedge 100 as the generator spins. In this manner, high-speed generators can use the core pole tips 506 and 508 to provide support to the wedge 100 along its entire length. As a result of the support provided by the pole tips 506 and 508, the wedge 100 is not required to be as stiff, thus permitting the thick webs seen at the top of many conventional wedges to be eliminated, further reducing the weight of the wedge 100.

In one embodiment of the invention, a radius member 112 may be machined at each end of the wedge 100. When the wedge 100 is inserted into the inter-pole cavities of a generator rotor 400, the wedge 100 may be secured to the generator rotor 400 by bands 602 around the perimeter the generator rotor 400 that secure the radius member 112 of the wedges.

Various embodiments of the wedge 100 may be used directly in place of any conventional wedge once it has been determined that the core pole tips have sufficient strength margin to support these wedges 100. In various embodiments of the invention, manufacture of this type of wedge 100 can be achieved by machining, casting/molding or fabrication. Different materials can be used to make the wedge 100, including metals (e.g., aluminum, steel, and/or titanium) and/or reinforced epoxy plastics such as PEEK. One embodiment of the invention uses the lightest weight material combined with a suitable manufacturing process to achieve the strength required for the desired application. In many cases, this would take the form of a molded reinforced epoxy plastic.

In various embodiments of the invention, the wedges 100 and coils 502 and 504 may have a bonding or securing material between them. For instance, an epoxy may be impregnated between side wall 106 of wedge 100 and the abutting surface of coil 502 so that the epoxy also passes through holes 110. This prevents the coils 502 and 504 from loosening or being deformed by the centrifugal force of a high speed generator.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A support member configured to be disposed between a first and a second core pole of a rotor, the support member comprising:

a wedge including an axially extending wall, a first and a second side wall, a first and a second end, and a first and a second end wall, the first and second side walls extending radially from and integrally formed with the axially extending wall, and the first and second end walls formed at the first and second ends integrally with the axially extending wall and the first and second sidewalls;

a plurality of cavities formed in the wedge between the first and the second ends; and a first and a second radial member extending axially from and integrally formed as part of the first and the second end walls, respectively.

2. The support member of claim 1, wherein at least one web is formed between two cavities of the plurality of cavities.

3. The support member of claim 1, further comprising:
a plurality of holes formed in the first side wall.

4. The support member of claim 3, further comprising:
a bonding material impregnated through the plurality of holes.

5. The support member of claim 1, wherein the wedge comprises metal.

6. The support member of claim 1, wherein die wedge comprises reinforced epoxy plastic.

7. A support system configured to be disposed between a first and a second core pole of a rotor, each having a first end and a second end, the support system comprising:
a wedge including an axially extending wall, a first and a second side wall, a first and a second end, and a first and a second end wall, the first and second side walls extending radially from and integrally formed with the axially extending wall, and the first and second end walls formed at the first and second ends integrally with the axially extending wall and the first and the second side walls;
a plurality of cavities formed within the wedge between the first and the second end walls;
a first and a second radial member each extending axially from and integrally formed as part of the first and the second end walls, respectively, the first and second radial members each configured to extend beyond the first and second core pole ends, respectively, when the wedge is disposed in the rotor, and
a first and a second band configured to at least partially surround the first and second radial members, respectively, to secure the wedge to the rotor.

8. The support system of claim 7, wherein at least one web is formed between two cavities of the plurality of cavities.

9. The support system of claim 7, further comprising:
a plurality of holes formed in the first side wall.

10. The support system of claim 9, further comprising:
a bonding material impregnated through the plurality of holes.

11. A generator comprising:
a rotor comprising:
a shaft; and
a first and a second core pole extending radially from the shaft and defining a space therebetween, each of the first and second core poles having a first and a second end; and
a support system disposed between the first and second core poles, the support system comprising:
a wedge disposed within the space and including an axially extending wall, a first and a second side wall, a first and a second end, and a first and a second end wall, the first and second side walls extending radially from and integrally formed with the axially extending wall, and the first and second end walls formed at the first and second ends integrally with the axially extending wall and the first and the second side walls;
a plurality of cavities formed within the wedge between the first and the second end walls;
a first and a second radial member each extending axially from and integrally formed as part of the first and the second end walls, respectively, and configured to extend beyond the first and second core pole ends when the wedge is disposed in the rotor; and
a first and a second band at least partially disposed around the first and second radial members, respectively, to secure the wedge to the rotor.

12. The generator of claim 11, wherein the first and second core poles each include pole tips extending at least partially into the space therebetween.

13. The generator of claim 11, wherein at least one web is formed between two cavities of the plurality of cavities.

14. The generator of claim 11, further comprising:
a plurality of holes formed in at least the first side wall.

15. The generator of claim 11, further comprising:
a bonding material impregnated through the plurality of boles and configured to bond the wedge first wall to the first core pole.

\* \* \* \* \*

UNITED STATES PATENT AND TRADEMARK OFFICE
CERTIFICATE OF CORRECTION

| | | |
|---|---|---|
| PATENT NO. | : 7,061,154 B2 | Page 1 of 1 |
| APPLICATION NO. | : 10/807724 | |
| DATED | : June 13, 2006 | |
| INVENTOR(S) | : Gregor McDowall et al. | |

It is certified that error appears in the above-identified patent and that said Letters Patent is hereby corrected as shown below:

Column 5, line 8, "die" should be changed to --the--.

Signed and Sealed this

Twenty-seventh Day of March, 2007

JON W. DUDAS
*Director of the United States Patent and Trademark Office*